United States Patent [19]

Nyssen et al.

[11] Patent Number: 5,332,698
[45] Date of Patent: Jul. 26, 1994

[54] GLASS FIBRES WITH IMPROVED BIOLOGICAL COMPATIBILITY

[75] Inventors: Peter R. Nyssen; Wolfram Wagner; Geert Christoph, all of Dormagen, Fed. Rep. of Germany

[73] Assignee: Bayer Aktiengesellschaft, Leverkusen, Fed. Rep. of Germany

[21] Appl. No.: 100,640

[22] Filed: Jul. 30, 1993

Related U.S. Application Data

[63] Continuation of Ser. No. 707,727, May 30, 1991, abandoned, which is a continuation-in-part of Ser. No. 518,380, May 3, 1990, abandoned.

[30] Foreign Application Priority Data

May 25, 1989 [DE] Fed. Rep. of Germany ....... 3917045

[51] Int. Cl.$^5$ .............................................. C03C 13/00
[52] U.S. Cl. ......................................... 501/35; 501/38
[58] Field of Search ..................................... 501/35, 38

[56] References Cited

U.S. PATENT DOCUMENTS

| | | | |
|---|---|---|---|
| 2,882,173 | 4/1959 | Welsch et al. | 501/38 |
| 3,523,803 | 8/1970 | Haslay et al. | 501/38 |
| 3,853,569 | 12/1974 | Laurent et al. | 501/35 |
| 4,177,077 | 12/1979 | Gagin | 501/35 |
| 4,396,722 | 8/1983 | Rapp | 501/35 |
| 4,615,988 | 10/1986 | LeMoigne et al. | 501/35 |
| 4,764,487 | 8/1988 | Lewis | 501/38 |

OTHER PUBLICATIONS

Bayer, Product Information Literature, Feb. 1989.

Primary Examiner—Karl Group
Assistant Examiner—Deborah Jones
Attorney, Agent, or Firm—Sprung Horn Kramer & Woods

[57] ABSTRACT

Glass fibres which are distinguished by their greatly reduced carcinogenicity have an average fibre diameter of <8 μm, preferably <3 μm, with more than 10% of the fibres having a diameter of <3 μm. The types of glass used for producing these fibres are characterized by containing the following compounds in the proportions shown in mol %:

| | |
|---|---|
| SiO$_2$ | 55–70 |
| B$_2$O$_3$ | 0–4 |
| Al$_2$O$_3$ | 0–1 |
| TiO$_2$ | 0–6 |
| Iron oxides | 0–2 |
| MgO | 0–5 |
| CaO | 12–20 |
| Na$_2$O | 10–20 |
| K$_2$O | 0–5 |
| fluoride | 0–2. |

3 Claims, 2 Drawing Sheets

GLASS FIBRES WITH IMPROVED BIOLOGICAL COMPATIBILITY

CROSS REFERENCE TO RELATED APPLICATION

This application is a continuation of application Ser. No. 07/707,727, filed May 30, 1991, now abandoned. Which is a continuation-in-part of applicant's co-pending parent application Ser. No. 518,380, filed on May 3, 1990, now abandoned.

BACKGROUND OF THE INVENTION

Proof of the carcinogenic effect of asbestos has been available since the end of the 1950's. Further research in recent times has shown that the carcinogenicity is not confined to asbestos but that any fibrous dust in the form of elongated particles is liable in principle to initiate carcinogenic mechanisms which according to the present state of scientific knowledge differ distinctly from the carcinogenic mechanisms of other chemical substances or ionizing radiation.

For reasons of industrial health and safety in dealing with fibrous dust, there has been in existence since the 1960's a scientifically recognized definition of an inhalable fibre which may be toxicologically active. This definition relates to a fibre recognizable under the optical microscope as having a geometrical diameter of $<3$ $\mu m$, a length of $>5$ $\mu m$ and a length/diameter ratio of more than 3:1. This definition is based on the findings relating to the carcinogenic effect of asbestos, Man made mineral fibres such as glass fibres, basalt fibres, slag fibres and ceramic fibres which are produced in some cases in the form of short fibres may also come under this definition. For many technical applications it is preferred to use man made mineral fibres (KMF=künstliche Mineralfasern) having a much smaller geometrical diameter than 3 $\mu m$. e.g. so-called micro glass fibres made of C- and E-glasses, which have fibre diameters of from 0.1 $\mu m$ to 5 $\mu m$. Man made mineral fibres which have been produced by known processes for insulating purposes, e.g. by centrifugal basket processes, centrifugal wheel processes or blow processes, also contain a proportion of fibres having a diameter of less than 3 $\mu m$ and to some extent even less than 1 $\mu m$. The fibres mentioned here have been described, e.g. in [1]. Such fibres are of great technical and economical interest for a wide variety of uses.

In places in which man made mineral fibres are produced or used, the fibres in the atmosphere may on average be shorter and thinner than those in the finished products. Transport mechanisms and forms of distribution and transformation of man made mineral fibres dusts are illustrated in the literature reference [2] which also gives data concerning exposure to fibres entering the lungs in the production and processing of man made mineral fibres. Further information may also be obtained from [3]. Detailed information on the carcinogenic effect of man made mineral fibres is now available as a result of numerous scientific investigations carried out worldwide. These include inter alia animal experiments such as inhalation tests, intratracheal and intraperitoneal experiments and cytobiological and other in vitro studies. A summary of results is given in [4] in which the carcinogenic effect is determined by the cooperation of the following two factors:

1. The fibrous form, e.g. in accordance with the above definition and
2. the persistence (length of stay) in the lung.

The most conclusive results of comparisons between natural and man-made mineral fibres are obtained from animal experiments in which the dusts are administered intraperitoneally or intrapleurally as these are able to produce spontaneous rumours. According to [5] and [6], IARC has undertaken to subdivide man-made mineral fibres into carcinogenic and non-carcinogenic fibres. According to this classification, man made mineral fibres such as thin glass fibres, stone fibres and ceramic fibres as well as many types of asbestos may be carcinogenic. Thick glass fibres and unstable glass fibres are non-carcinogenic. The stability of man-made fibres depends to a large extent on their chemical composition. The length of stay of fibrous dusts in the lung (persistence) depends on the composition and size of the dust particles.

The greater the chemical stability and the greater the geometrical diameter of the fibres, the greater will be the persistence.

Reference [4] gives results of more recent intraperitoneal experiments which unequivocally prove the carcinogenic effect of various man-made mineral fibres such as basalt fibres and special micro glass fibres. It is surprisingly found that glass fibres having an average fibre diameter of very much less than 1 $\mu m$ are also highly carcinogenic. It is known that such fibres have a high chemical stability due to the composition of the glass. Important guidelines for the solubility of man-made mineral fibres in vivo and in vitro are found in [7]. The significance of the chemical composition for carcinogenesis is investigated in [8], in which it is found that fibres which have been pretreated intensively with an acid have no more tumour producing effect than untreated fibres.

There is scientific evidence that the carcinogenic effect of man-made mineral fibres depends to a high degree on the capacity for removal of the fibres from the lungs. This capacity will hereinafter be referred to as "lung clearance". It is determined by animal experiments and depends on two factors, namely 1. the so-called translocation, e.g. by macrophages, and
2. the solubility of the fibres.

In inhalation experiments, there is possibly the added factor of alveolarclearance. Clearance experiments in rat lungs after intratracheal installation of fibres are described in reference [9] which also gives data on the half life times of lung clearance for various mineral fibres, in particular glass fibres.

DESCRIPTION OF THE INVENTION

The present invention is based on the state of knowledge outlined above. It is an object of this invention to develop toxicologically harmless glass fibres, i.e. glass fibres which have no carcinogenic potential.

This object is achieved according to the invention by means of glass fibres having improved biological compatibility, characterized in that the fibres have an average diameter of $\leq 8$ μm and more than 10% of the fibres have a diameter of $\leq 3$ μm, and in that the glasses used for producing the fibres contain the following compounds in the proportions given in mol-%:

| | |
|---|---|
| SiO₂ | 55–70 |
| B₂O₃ | 0–4 |
| Al₂O₃ | 0–1 |
| TiO₂ | 0–6 |
| Iron oxides | 0–2 |
| MgO | 0–5 |
| CaO | 12–20 |
| Na₂O | 10–20 |
| K₂O | 0–5 |
| fluoride | 0–2. |

| | |
|---|---|
| SiO₂ | 55–70 |
| B₂O₃ | 0–4 |
| Al₂O₃ | 0–1 |
| TiO₂ | 0–6 |
| Iron oxides | 0–2 |
| MgO | 0–5 |
| CaO | 12–20 |
| Na₂O | 10–20 |
| K₂O | 0–5 |
| fluoride | 0–2. |

Further, glass fibres characterized in that the fibres contain the following compounds in the proportions given in

| | mol-% |
|---|---|
| SiO₂ | 58–65 |
| B₂O₃ | 0–4 |
| Al₂O₃ | 0–1 |
| TiO₂ | 0–3 |
| Iron oxides | 0–1 |
| MgO | 1–4 |
| CaO | 12–20 |
| Na₂O | 12–18 |
| K₂O | 0,2–3 |
| fluoride | 0–1, |
| | are particularly preferred. |

Glass fibres having this composition have excellent physiological solubility. It was found that the physiological solubility was accompanied by high chemical solubility in acids and bases.

Such glass fibres show no carcinogenic potential, in contrast to asbestos and glass fibres having a composition differing from the composition according to the invention.

In the case of the glass fibres having the preferred composition given above, it was found that after intratracheal installation in rat lungs, the number of fibres fell to half the original number within less than 115 days and that after intraperitoneal installation in rat lungs the tumour rate after 2 years was less than 10%. In the glass fibres having proportions of TiO₂, BaO, ZnO, SrO and ZrO₂ of $\leq 1$ mol %, the half life was only 42 days and the tumour rate measured after 2 years was less than 5%. Such glass fibres may therefore be classified as non-carcinogenic.

EXAMPLES OF PRACTICAL EMBODIMENT

Example 1

Figure 1:
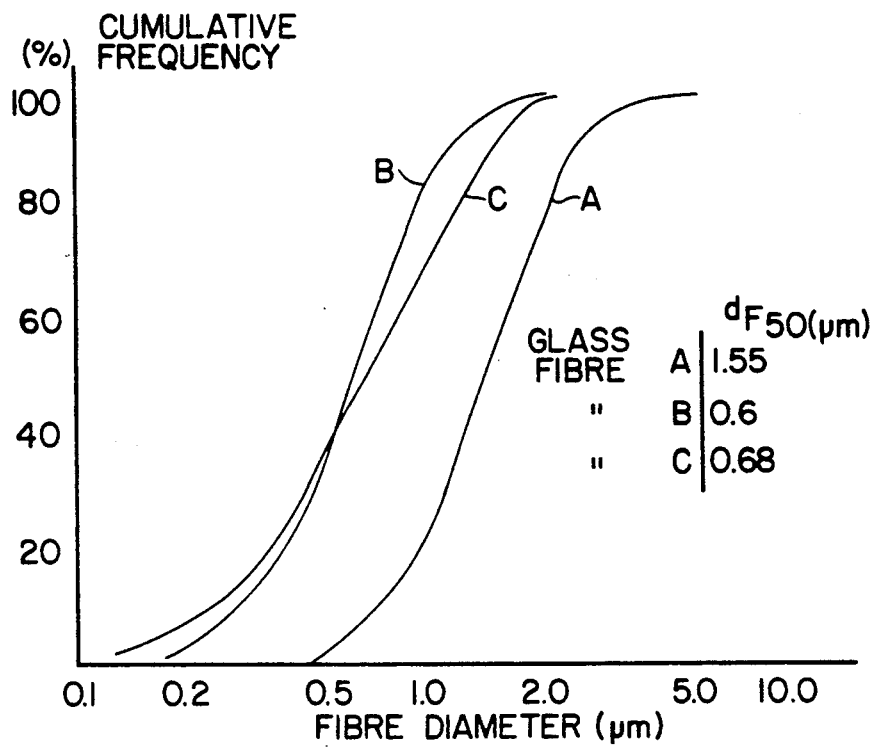
FIG. 1 is a graphical representation of the diameter distributions for glass fibers A, B & C.

Glass fibres A and B having the initial diameter distributions shown in FIG. 1 were produced for investigating the physiological compatibility in vivo (biostability). The fibres were produced by the debiteuse process described in EP-A 279 286. The distributions of diameters were determined by means of a raster electron microscope. The two types of fibres, A and B, differed only in their average diameter. The chemical composition of the glasses was in both cases as follows:
$SiO_2 = 60.7\%$;
$B_2O_3 = 3.3\%$;
$Na_2O = 15.4\%$;
iron oxides $= 0.2\%$;
$K_2O = 0.7\%$;
$CaO = 16.5\%$;
$MgO = 3.2\%$ (all figures given in percent by weight).

The starting materials used for producing the glasses are normally quartz sand, boric acid, dolomite, lime, soda, potash and optionally also other conventional raw materials such as cryolite, titanium dioxide and sodium fluoride.

The fibres samples were size reduced in a cutting mill or a ball mill and 1 mg of each sample was suspended in water, applied to a filter by suction and investigated under a raster electron microscope at a magnification of 500 to 1500. Determination of the length and thickness of the individual fibres was carried out semi-automatically on the basis of raster electron microscopic images (REM) with the aid of graph tables and arithmetically determined data. The fibre volumes and the number of fibres per unit mass were determined from the length and thickness distributions. Particular attention was given to the proportion of fibres having a length above 5 μm, a diameter below 3 μm and a length/diameter ratio above 3 as these were regarded as biologically effective fibres. The results of the experiments are shown in the following Table.

| Sample | Fibre length [μm] | | | Fibre diameter [μm] | | | Proportion of fibres in % L > 5 μm D < 3 μm | Volume [μm³] | Fibres/ng L > 5 μm D < 3 μm |
|---|---|---|---|---|---|---|---|---|---|
| | 10%< | 50%< | 90%< | 10%< | 50%< | 90%< | | | |
| A | 4.3 | 8.0 | 18.3 | 0.89 | 1.68 | 2.56 | 80.7 | 45 | 6.4 · 10⁶ |
| B | 1.6 | 4.6 | 14.0 | 0.26 | 0.48 | 0.88 | 46.9 | 3.2 | 58 · 10⁶ |

Figure 2:
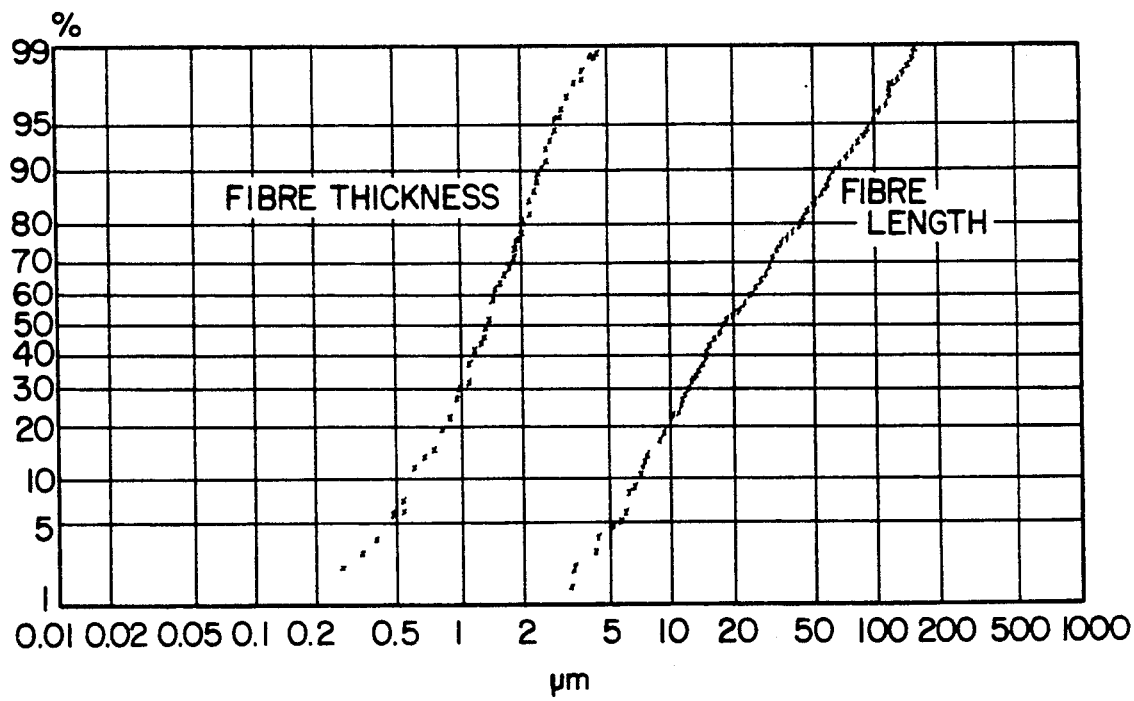
FIG. 2 is a graphical representation of the distribution of fiber length and fiber thickness of the glass fibers A of Example 1.
Figure 3:
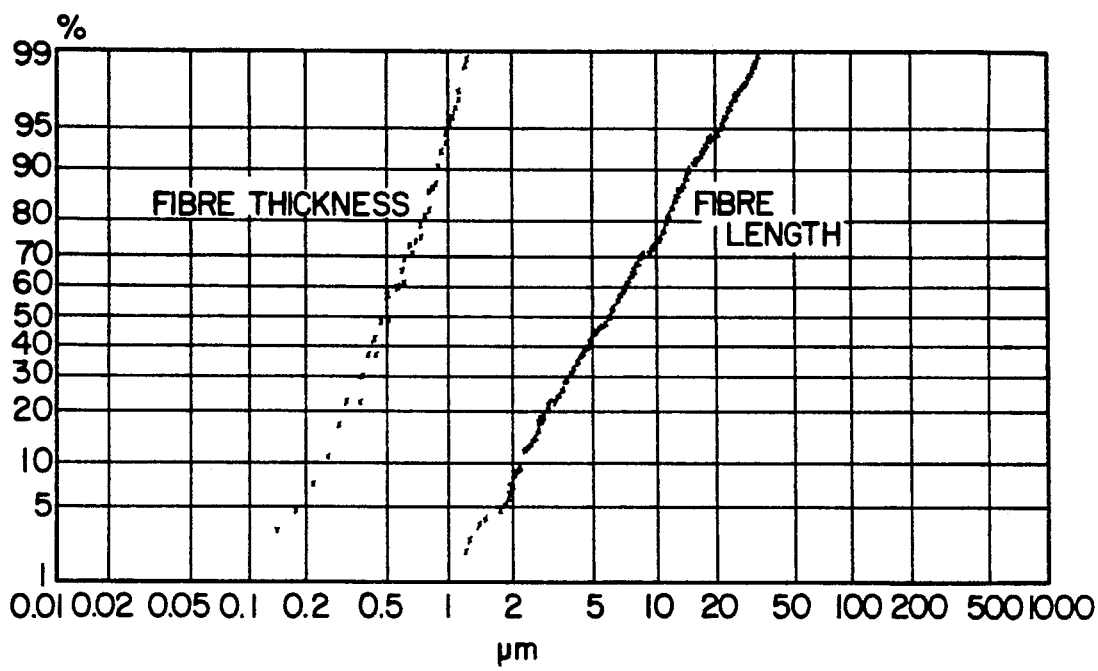
FIG. 3 is a graphical representation of the distribution of fiber length and fiber thickness of the glass fibers B of Example 1.
Figure 4:
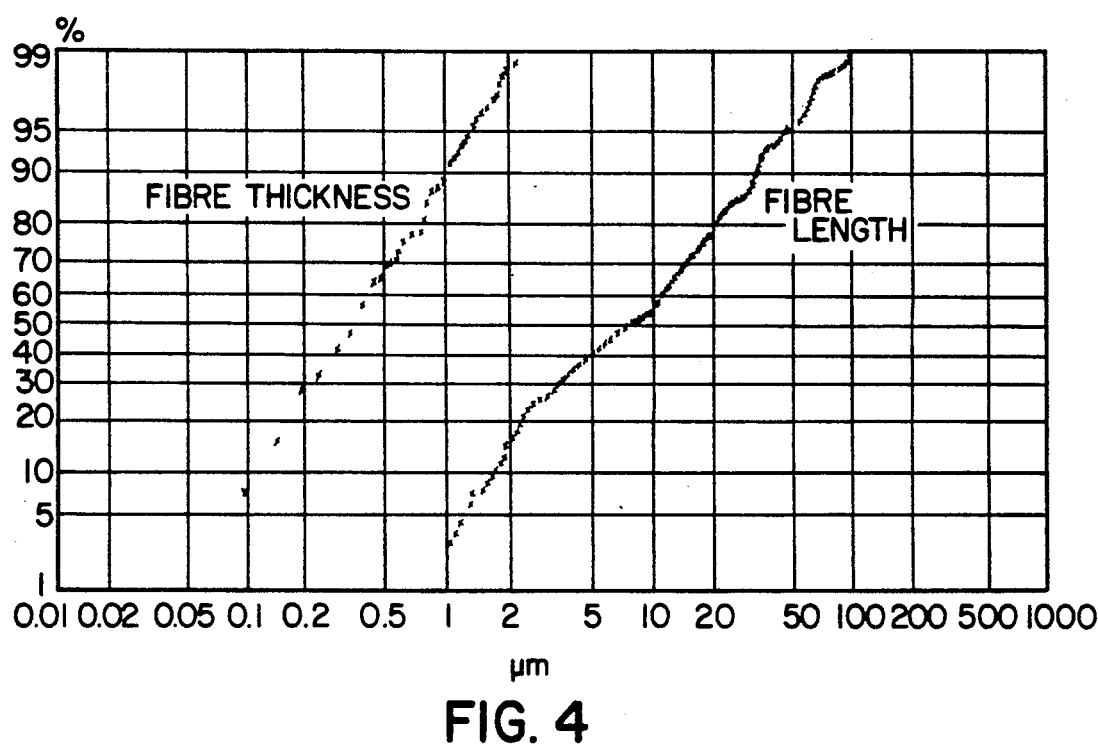
FIG. 4 is a graphical representation of the distribution of the fiber length and fiber thickness of the glass fibers C of Example 2.

The logarithmic graph obtained from the individual measurements of fibre length and fibre thickness shows a good approximation to a straight line (FIGS. 2, 3), i.e. the values obey a normal distribution.

The following Table gives the calculated number of biologically critical fibres per ng for a particular class of fibres.

| Sample | Def. 1 L > 3 μm D < 3 μm L/D > 3 | Def. 2 L > 3 μm D < 1 μm L/D > 3 | Def. 3 L > 3 μm D < 1 μm L/D > 5 |
|---|---|---|---|
| A | 7.316 | 0.623 | 0.534 |
| B | 85.119 | 79.457 | 75.834 |

The fibre samples A and B were made up into suspensions of 2 mg of fibre material in 0.4 ml of physiological saline solution and these suspensions were instilled intratracheally into 35 female Wistar rats. 6 Animals per group of fibres were dissected after 1 day and after 1, 6, 12 and 24 months and the lungs were removed, dried and plasma ashed at 300° C. The fibres were freed from salt constituents by suspending 1 part of each lung ash in 1N hydrochloric acid and treating it with ultrasound for several minutes. The fibres were then isolated on a filter. The fibres thus prepared were investigated under a REM in the same manner as the initial fibre samples.

In addition, the number of fibres per lung was determined arithmetically from the number of fibres measured and an interpretation of the images and the original weight of the filter. The fibre mass was determined from the average fibre volume and the density. The results obtained are shown in the following Table.

| Sample | Time [months] | Fibres [$10^6$/lung] Average | Std. | Fibres [L > 5 μm] [$10^6$/lung] Average | Std. | Fibre mass [μg] Average | Std. |
|---|---|---|---|---|---|---|---|
| A | 1 day | 8.530 | 1.381 | 6.271 | 0.586 | 793.92 | 168.60 |
|   | 1 | 11.843 | 1.754 | 8.723 | 1.291 | 351.49 | 70.43 |
|   | 6 | 3.015 | 0.316 | 1.798 | 0.309 | 66.12 | 28.22 |
|   | 12 | 0.843 | 0.169 | 0.660 | 0.132 | 19.79 | 5.80 |
|   | 24 | 0.077 | 0.002 | 0.064 | 0.009 | 5.64 | 2.20 |
| B | 1 day | 110.380 | 15.188 | 44.141 | 13.317 | 649.59 | 166.41 |
|   | 1 | 59.758 | 5.774 | 27.003 | 5.729 | 265.84 | 24.29 |
|   | 6 | 4.175 | 1.626 | 1.551 | 0.781 | 17.69 | 7.42 |
|   | 12 | 0.120 | 0.037 | 0.065 | 0.010 | 5.09 | 3.07 |
|   | 24 | 0.022 | 0.007 | 0.010 | 0.004 | 0.17 | 0.18 |

It is clear from these experiments that both the number and the mass of fibres decreased rapidly (good lung clearance). Using an arithmetic formulation of a first order kinetiks, so-called half life values are obtained for the lung clearances, i.e. the lengths of time within either the number or the mass of fibres decreases to half the original value. The half life values calculated in days are shown in the following Table which also gives 95% statistical confidence values to the right and left of each average value. A "statistical confidence value of 95%" means that the half life value shown to the right or left of the average value occurs with a probability of 5%.

| Sample | Fibre number > average < | | | Fibre number [L > 5 μm] > average < | | | Fibre mass > average < | | |
|---|---|---|---|---|---|---|---|---|---|
| A | 96 | 102 | 109 | 98 | 106 | 115 | 88 | 106 | 133 |
| B | 35 | 37 | 39 | 36 | 39 | 42 | 42 | 51 | 65 |

The following Table shows a comparison of the half life values with the half life values disclosed according to the state of the art in [9] for man-made mineral fibres having different chemical compositions. Since the half life value must in theory decrease with decreasing fibre diameter, an absolute comparison of lung clearance can only be made if the median fibre diameter is taken into account. This is achieved by means of the data shown in the Table, i.e. the half life value measured with reference to the median value of the diameter. The Table shows that the values obtained for fibre samples A and B differ greatly from the values shown in [9].

| Fibre | $d_{F50}$ μm | Half life value according to fibre number (L > 5 μm)(days) | Half life value/$d_{F50}$ (L > 5 μm) [days/μm] |
|---|---|---|---|
| A | 1.55 | 106 | 68 |
| B | 0.6 | 39 | 65 |
| Crocidolite | 0.15 | 1000 | 6667 |
| Glass fibre | | | |
| 104/E | 0.1 | 55 | 550 |
| 104/475 | 0.18 | 3500 | 19444 |
| 104/753 | 0.20 | 165 | 825 |
| Glass wool | 0.91 | 272 | 299 |
| Rock wool | 1.8 | 283 | 157 |
| Ceramic wool | 0.8 | 780 | 975 |

The rates of tumours in fact induced after intraperitoneal injection can be seen from .[4] and [10].

| Fibre | Tumour rate [%] | $d_{F50}$ |
|---|---|---|
| Crocidolite | 56.3–87.5 | 0.2 |
| Chrysotile | 33–83 | 0.03–0.11 |
| Glass fibre 104/475 | 64 | 0.15 |
| Basalt fibre | 57 | 1.1 |
| Ceramic fibre | 70 | 0.89 |

The results clearly show that man-made and natural mineral fibres which have a high half life value for lung clearance together with a high degree of fineness of fibres (high value for half life value/$d_{F50}$) have a high carcinogenic potential. Moreover, the greater the relative half life value, based on the diameter, the greater is the carcinogenic potential.

Example 2

A fibre sample C having the diameter distribution shown in FIG. 1 was produced by the blast nozzle process according to EP-A-279 286 from the following chemical composition:

$SiO_2$ = 58.5%;
$B_2O_3$ = 11.0%;
$Na_2O$ = 9.8%;
$Al_2O_3$ = 5.8%;
iron oxides = 0.1%;
BaO = 5.0%;
ZnO = 3.9%;
$K_2O$ = 2.90%;
CaO = 3.0%.

After the sample had been ground down the following fibre values were obtained analogously to Example 1:

Proportion of fibres [%]   Fibres/ng

-continued

| | Fibre length [μm] | | | Fibre diameter [μm] | | | L > 5 μm | Volume | L > 5 μm |
|---|---|---|---|---|---|---|---|---|---|
| Sample | 10%< | 50%< | 90%< | 10%< | 50%< | 90%< | D < 3 μm | [μm³] | D < 3 μm |
| C | 1.3 | 5.6 | 31.5 | 0.15 | 0.39 | 0.98 | 52.5 | 21 | 9.4 · 10⁶ |

The following Table shows the calculated number of biological critical fibres for each class of fibres:

| Sample | Def. 1<br>L > 3 μm<br>D < 3 μm<br>L/D > 3 | Def. 2<br>L > 3 μm<br>D < 1 μm<br>L/D > 3 | Def. 3<br>L > 3 μm<br>D < 1 μm<br>L/D > 5 |
|---|---|---|---|
| C | 11.475 | 9.734 | 9.734 |

These fibres were again instilled intratracheally into 35 Wistar rats. The fibre samples were then isolated after 1 day and 1. 6, 12 and 24 months as in Example 1 and tested for the lung clearance. The results of the experiments are shown in the following Table.

| Sample | Time [months] | Fibres [10⁶/lung]<br>Average | Std. | Fibres [L > 5 μm]<br>[10⁶/lung]<br>Average | Std. | Fibre mass [μg]<br>Average | Std. |
|---|---|---|---|---|---|---|---|
| C | 1 day | 51.130 | 15.561 | 32.091 | 10.742 | 994.50 | 195.88 |
| | 1 | 62.712 | 16.027 | 38.820 | 13.177 | 1039.20 | 409.17 |
| | 6 | 21.698 | 4.264 | 11.778 | 3.920 | 340.88 | 139.14 |
| | 12 | 10.474 | 1.208 | 7.231 | 0.522 | 215.80 | 3.97 |
| | 24 | 7.077 | 2.181 | 5.011 | 1.737 | 200.30 | 29.89 |

Compared with the fibres of Example 1, these fibres decrease substantially more slowly in number and mass. The decrease is particularly small in the period from the 12th to the 24th month; this may be attributed to the high stability of these fibres due to their chemical composition.

The half life values obtained from the data given in the preceding Table are as follows:

| Sample | Fibre number<br>> average < | | | Fibre number<br>[L > 5 μm]<br>> average < | | | Fibre mass<br>> average < | | |
|---|---|---|---|---|---|---|---|---|---|
| C | 184 | 233 | 317 | 190 | 254 | 380 | 213 | 306 | 542 |

Measurement of Tumor Rates

The tumour rates were systematically investigated for the fibres according to Examples 1 and 2. For this purpose, the fibre samples A, B and C described in Examples 1 and 2 were injected intraperitoneally into Wistar rats and the tumour rates were investigated after 2 years. The samples were prepared by grinding the initial fibre samples in a cutter and ball mill. The size distributions of the fibre samples thus obtained are shown in the following Table:

| | Fibre length [μm] | | | Fibre diameter [μm] | | |
|---|---|---|---|---|---|---|
| Sample | 10%< | 50%< | 90%< | 10%< | 50%< | 90%< |
| A1 | 4.1 | 7.7 | 18.0 | 0.88 | 0.67 | 2.57 |
| A2 | 4.1 | 7.7 | 18.0 | 0.88 | 0.67 | 2.57 |
| B1 | 1.4 | 4.4 | 14.1 | 0.25 | 0.47 | 0.90 |
| B2 | 1.4 | 4.4 | 14.1 | 0.25 | 0.47 | 0.90 |
| C1 | 1.2 | 5.5 | 32.1 | 0.14 | 0.38 | 0.99 |
| C2 | 1.2 | 5.5 | 32.1 | 0.14 | 0.38 | 0.99 |

The fibre samples were injected intraperitoneally in various doses in the form of a suspension in 2 ml of NaCl solution. The aim was to obtain the largest possible number of critical fibres having a length greater than 5 μm in order to increase the tumour producing effect. The results of the experiments measured after a period of 2 years are summarized in the following Table:

| | Intraperitoneal dose | | Fibre number<br>[L > 5 μm]<br>* 10⁶ | Number<br>of<br>animals | Animals<br>with<br>tumours | Tumour<br>rate<br>[%] |
|---|---|---|---|---|---|---|
| Sample | [mg] | | | | | |
| A1 | 1 × 20 | | 144 | 48 | 0 | 0 |
| A2 | 3 × 20 | | 432 | 48 | 0 | 0 |
| B1 | 1 × 6.7 | | 395 | 48 | 0 | 0 |
| B2 | 1 × 20 | | 1180 | 47 | 0 | 0 |
| C1 | 1 × 6.7 | | 66 | 48 | 14 | 29.2 |
| C2 | 1 × 20 | | 196 | 48 | 25 | 52.1 |

It is found that the fibres C are highly carcinogenic in spite of the relatively small number of critical fibres (L > 5 μm) whereas no carcinogenicity could be found in samples A and B. The results for lung clearance shown in Examples 1 and 2 thus correlate clearly with the results for carcinogenicity.

Measurement of Acid Resistance

To investigate the chemical stability, glass fibres having the composition shown in Example 1 and having an average fibre diameter of 0.5 μm determined by electron microscope (REM measurement) were treated as follows in 37% sulphuric acid at room temperature and at 60° C.:

The glass fibres which were to be investigated were first dried to constant weight in a circulating air drying cupboard at 110° C. After cooling and conditioning in a desiccator, 2.0 g of glass fibres were accurately weighed out and introduced into a 250 ml Teflon-Erlenmeyer flask and 100 times their weight of 37% sulphuric acid was then added. The samples to be investigated were then heated to the particular temperature to be used for the test and kept at this temperature with an accuracy of ±1° C. during the treatment time.

After this heat treatment, the glass fibres were removed from the sulphuric acid solution, introduced into a glass frit of porosity No. 4 which had previously been weighed accurately, and then rinsed with 5 l of completely salt-free water until the filtrate was neutral. The glass fibre sample was then dried at 110° C. for 4 hours and weighed in a desiccator after cooling and conditioning. The weight losses in percent by weight are shown in the following Table.

a) Treatment in 37% sulphuric acid at room temperature

Weight loss after a residence time in hours:

| Residence time [h] | Weight loss [%] |
|---|---|
| 1 | 3.9 |
| 2 | 4.0 |
| 4 | 7.1 |
| 8 | 11.8 |
| 16 | 16.0 |
| 24 | 17.1 |
| 48 | 19.1 |
| 72 | 17.8 | b) Treatment in 37% $H_2SO_4$ at 60° C.

| Residence time [h] | Weight loss [%] |
|---|---|
| 1 | 20.8 |
| 2 | 20.4 |
| 4 | 22.1 |
| 8 | 22.8 |
| 16 | 24.1 |
| 24 | 26.4 |
| 48 | 22.7 |
| 72 | 25.8 |

Measurement of Resistance to Alkalis

Glass fibres having the composition shown in Example 1 and an average fibre diameter of 2.0 μm determined by electron microscope are treated in an aqueous 0.1N NaOH solution at room temperature and at 60° C. by a method analogous to that employed for the test acid resistance. The weight losses obtained after different treatment times are shown in the following Tables:

a) Treatment in 0.1N NaOH solution at room temperature

| Residence time [h] | Weight loss [%] |
|---|---|
| 1 | 2.1 |
| 2 | 2.3 |
| 4 | 3.1 |
| 8 | 3.0 |
| 16 | 4.7 |
| 24 | 5.9 |
| 48 | 8.8 |
| 72 | 11.1 | b) Treatment in 0.1N NaOH solution at 60° C.

| Residence time [h] | Weight loss [%] |
|---|---|
| 1 | 5.6 |
| 2 | 13.4 |
| 4 | 17.1 |
| 8 | 26.8 |
| 16 | 38.2 |
| 24 | 34.5 |
| 48 | 36.9 |
| 72 | 41.1 |

Literature References

[1] Poeschel, E. und A. Köhling: Asbestersatzstoffkatalog Bd, 1, Faser- und Füllstoffe, Berlin: Bundesumweltamt 1985

[2] WHO, International Programme of chemical safety draft environmental health criteria for man made mineral fibers, November 1986

[3] International Symposium of Man-made Mineral Fibres in the Working Environment WHO, Okt. 1986

[4] Pott, F.: Die krebserzeugende Wirkung anorganischer Fasern im Tierexperiment—Daten und Bewertung; Umwelthygiene, Bd, 20, Institut fur Umwelthygtene Dusseldorf, Jahresbericht 1987/88

[5] WHO, Asbestos and other natural mineral fibres; Environmental health criteria 53—General WHO 1986

[6] IARC-Monographs: Man made mineral fibres and radon, Vol. 43—Lyon, International Agency of Research on Cancer 1988

[7] Leineweber, J. P.: Solubility of fibres in vitro und in vivo; Biological effects of man-made mineral fibres, Copenhagen, 1982

[8] Davis, J. M. G.: A review of experimental evidence for the carcinogenicity of man-made vitreous fibres, Scand. J, Work Environ. Health 12, Suppl. 1 (1986) 12–17

[10] Bellmann, B., H. Muhle et al.: Persistance of man made mineral fibres and Asbestos in rat lungs Am. Occup. Hyg. Vol. 31, 1987

[11] Pott, F. et al.: Carcinogenicity studies on fibres, metal compounds and some other dusts in rats Exp. Pathol. 32, 129–152, 1987

We claim:

1. Glass fibres with improved biological compatibility, comprising fibres having a length of from 5μ to 150 μm, an average diameter of ≦8 μm and more than 10% of which have a diameter of ≦3 μm, and wherein the glasses used for producing the fibres consist essentially of the following compounds in the proportions give in mol %:

| | |
|---|---|
| $SiO_2$ | 55–70 |
| $B_2O_3$ | 0–4 |
| $Al_2O_3$ | 0–1 |
| $TiO_2$ | 0–6 |
| Iron oxides | 0–2 |
| MgO | 0–5 |
| CaO | 12–20 |
| $Na_2O$ | 10–20 |
| $K_2O$ | 0–5 |
| Fluoride | 0–2 |

2. Glass fibres according to claim 1, wherein the fibres consist essentially of the following compounds in the proportions give in mol %:

| | |
|---|---|
| $SiO_2$ | 58–67 |
| $B_2O_3$ | 0–4 |
| $Al_2O_3$ | 0–1 |
| $TiO_2$ | 0–3 |
| Iron oxides | 0–1 |
| MgO | 1–4 |
| CaO | 12–20 |
| $Na_2O$ | 12–18 |
| $K_2O$ | 0.2–3 |
| Fluoride | 0–1 |

3. Glass fibres according to claim 1, wherein the fibres have an average diameter of ≦3 μm.

* * * * *